T. P. SHAFFNER.
Torpedo.
No 3,374. Reissued Apr. 13, 1869
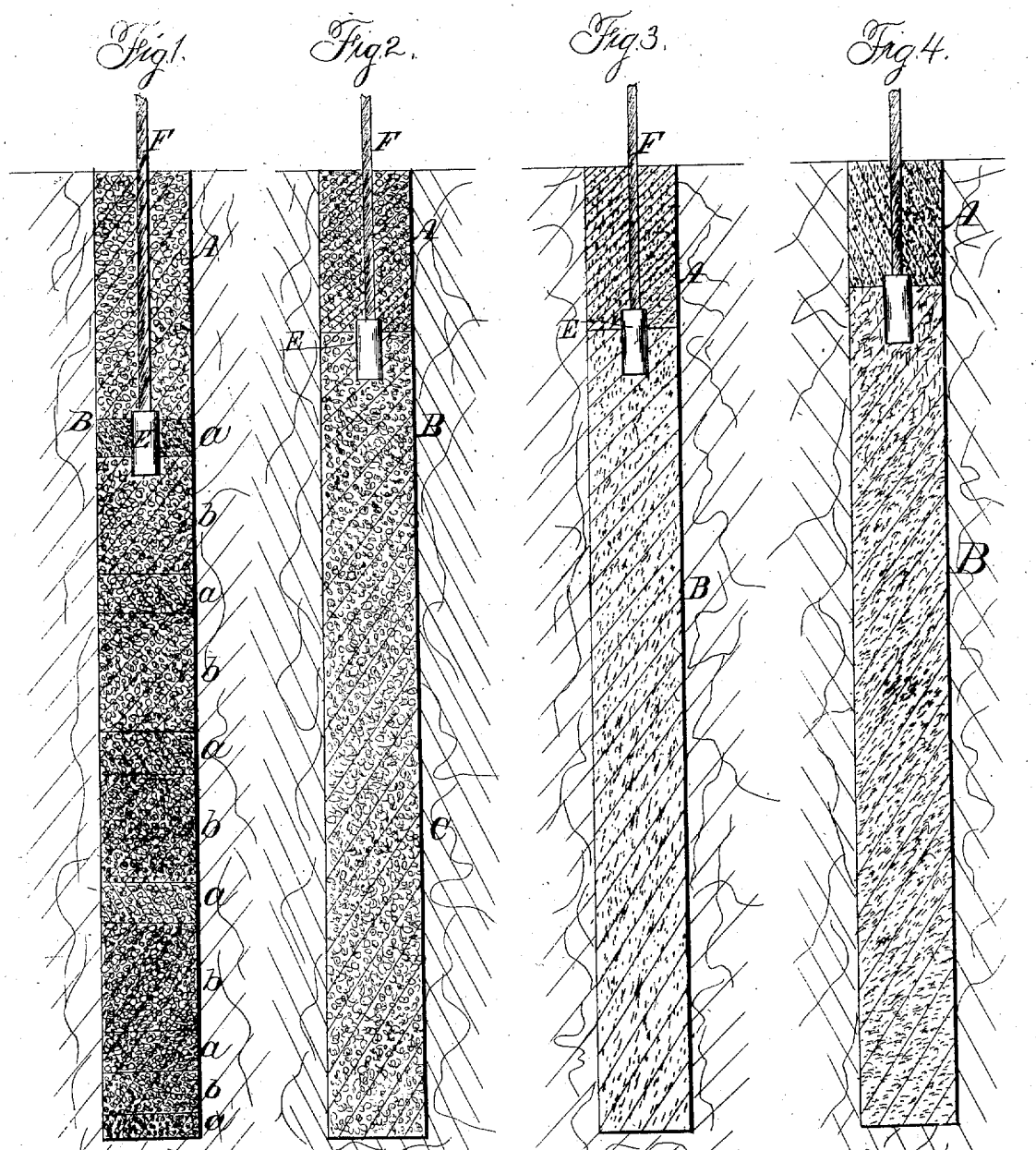
Witnesses:
James Dereau
Wm. Shaffner
Inventor:
Tal. P. Shaffner

UNITED STATES PATENT OFFICE.

TALIAFERRO P. SHAFFNER, OF LOUISVILLE, KENTUCKY.

IMPROVED METHOD OF BLASTING WITH NITROLEUM.

Specification forming part of Letters Patent No. 60,573, dated December 18, 1866; reissue No. 3,374, dated April 13, 1869.

DIVISION A.

*To all whom it may concern:*

Be it known that I, TALIAFERRO P. SHAFFNER, of Louisville, State of Kentucky, have invented or discovered a new and useful Improvement in the Manner of Using Nitro-Glycerine for Blasting or Artillery Purposes.

The nature of my invention or discovery consists in mixing nitro-glycerine with silicious earth, (or silicic acid,) or silicious matter in a solid or other condition, in any required proportions, as may be necessary for specific purposes.

The different proportions may be thus explained and illustrated—

Figure 1 represents a drill-hole, in rock, or other matter, charged as follows.

At the bottom, *a* represents pure nitro-glycerine, poured into the hole in such quantity as may be deemed necessary, considering the resistance of the matter to be disrupted. Above is a layer of sand and water, marked *b;* above that is a layer of sand and nitro-glycerine, marked *a*. The sand may have been poured in first, and then the nitro-glycerine poured in upon the sand. Sometimes I put in water upon the sand, to lessen the absorption of nitro-glycerine. Above are alternate layers of sand and water, or sand alone, and layers of sand and nitro-glycerine. A is tamping of sand or earth. F is a fuse, and E is a cartridge containing nitro-glycerine, which, when exploded at B, explodes the nitro-glycerine in layer *a*, which, by concussion, explodes the lower charges and disrupts the matter. The explosion of these charges converts the water into steam, which increases the disruption of the rock or other substance to be broken. In this manner I distribute the disrupting force or evolvent of gases over more surface, and attain greater success, whenever the rock or matter is separated by seams, or when "shaken" by a previous blast, than by placing the charge only at the bottom of the drill-hole.

If the sand is dry, it will absorb more nitro-glycerine than when wet. The particles of sand hold the nitro-glycerine upon the principle of capillary attraction, and prevent the liquid from running out of the drill-hole into the seams or crevices of the rock.

Fig. 2 represents a similar arrangement.

A is a tamping, F the fuse, E the exploding-cartridge, B the nitro-glycerine and coarse sand, C nitro-glycerine and fine sand.

A hole may charged in part with coarse sand and with fine sand, or with either the coarse or the fine sand, with water or without water.

Fig. 3 represents a hole charged with nitro-glycerine in gravel, or very coarse sand. Sometimes I use broken stone.

A is the tamping, F the fuse, E the exploding-cartridge, and B the gravel and nitro-glycerine.

Fig. 4 represents a hole charged with very fine sand, such as rotten-stone, tripoli, or other silicious matter, either granulated or in the form of powder.

If this fine powder be used, the absorption of nitro-glycerine can be regulated at discretion, and it may be used as a moistened powder or as a paste.

Any of the aforesaid modes of mixing may be adopted in the field where the blasting is done, or it may be done at the factory, and placed in cartridges or vessels, to suit convenience.

The mode of exploding this mixture of nitro-glycerine is by a strong percussion-cap, or heavy cartridge of gunpowder or gun-cotton, exploded in the midst of the nitro-glycerine.

When used in shells, for artillery or military purposes, the exploder should be a strong percussion-cap, fixed to the train-fuse inside the shell.

Having thus described my invention or discovery sufficiently clear and distinct to enable any one skilled in the arts to which it belongs to make and use the same, what I claim, and desire to secure by Letters Patent, is—

The use of nitro-glycerine and silicious matter mixed together, for blasting or military purposes, in the manner substantially as and for the purposes described.

TAL. P. SHAFFNER.

Witnesses:
JAMES DEVAU,
W. M. SHAFFNER.